May 4, 1943.  A. W. KEEN  2,318,498
BATTERY PASTE RETAINER
Original Filed Oct. 21, 1937
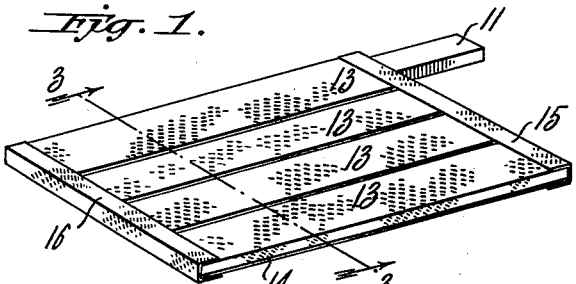
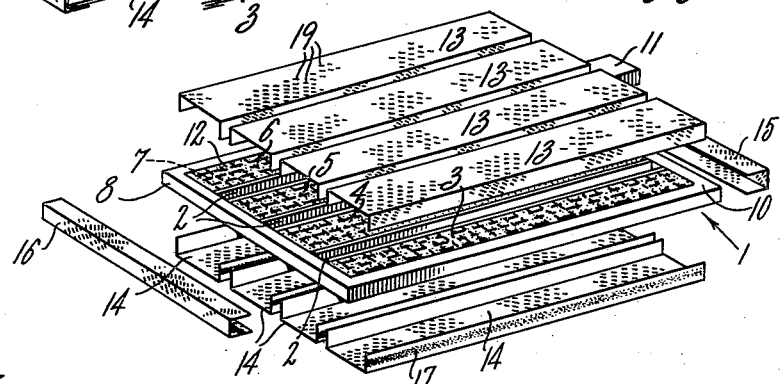
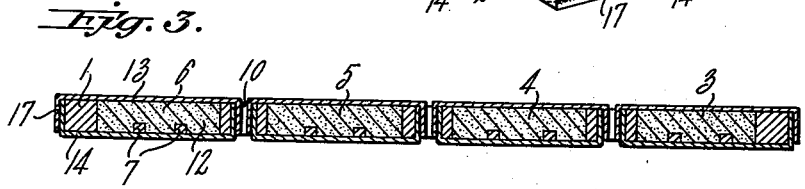
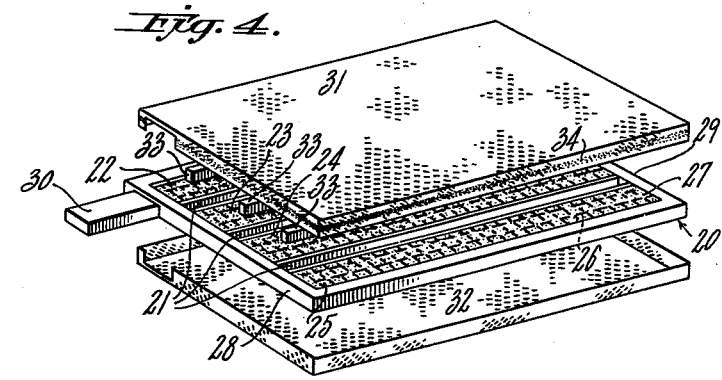
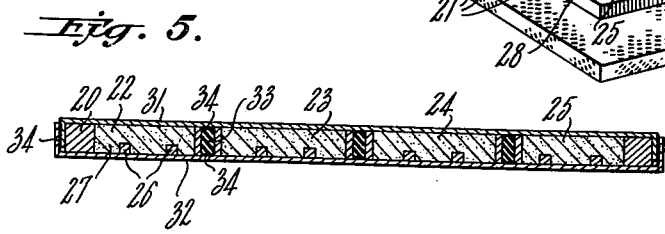
INVENTOR.
ALEXIS W. KEEN
BY Gourley & Budlong
ATTORNEYS Patented May 4, 1943

2,318,498

UNITED STATES PATENT OFFICE 2,318,498

BATTERY PASTE RETAINER

Alexis W. Keen, Packanack Lake, N. J., assignor to United States Rubber Company, New York, N. Y., a corporation of New Jersey Original application October 21, 1937, Serial No. 170,224. Divided and this application December 13, 1939, Serial No. 308,946

2 Claims. (Cl. 136—63)

This invention relates to battery paste retainers, and more particularly to paste retaining envelopes for secondary or storage battery plates formed of grids which hold electrochemically active paste material. This application is a division of my co-pending application Serial No. 170,224, filed October 21, 1937, now Patent No. 2,277,763, dated March 31, 1942. This invention is especially useful when applied to plates of storage batteries which are subjected to vibrations and to heavy charges and discharges of current.

Under certain conditions, such as railroad car and submarine service, heavy duty storage battery plates require protection against dislodgement of the active paste material. Since the plates are composed of a relatively light grid packed and covered with electrochemically active paste, a protective retainer is necessary to prevent the paste from being dislodged from the grids and accumulating at the bottom of the plate. To retain the paste within the grid, it has been customary to place thin perforate sheet material against opposite faces of the plate, particularly of the positive plate. Former methods of holding the sheet have relied generally on the pressure against the sheet exerted by the alternate positive and negative plates. Alternatively, envelopes have been formed of the sheet material to cover the battery plate loosely but such methods of holding the sheet material do not guarantee close contact with the paste. The result is that in service the active paste becomes dislodged from the grid and by gravity gradually works its way between the plate and the sheet material to the bottom of the cell, causing short circuits, with the ultimate result of curtailing or ending the life of the battery itself. This undesirable result is enhanced by the fact that during pasting operation of a battery grid, surface irregularities are formed on the active surfaces of the plate. No matter how tightly the sheet material is mechanically pressed against the general contour of the pasted faces of the grid, unless it conforms in shape to the surface irregularities in those faces, the paste, when vibrated, will gradually become displaced and after a period of time will accumulate in the gaps where the sheet is not in contact with the surface of the plate.

The present invention provides battery plates having paste retainers in the form of sheets or envelopes, secured to the plates and conforming closely to the irregularities of the surface of the plates so that the paste will not become dislodged from its proper position even in heavy duty service.

The retainer, according to the invention, may be employed to cover a battery plate having a solid mass of active paste, but it is preferred to employ a plate having openings extending through it so that the paste retainer sheet material may be anchored at closer intervals than merely around the edges of the plate. In forming the retainer around the plate, a plurality of covering sections are shaped, treated with adhesive, and fitted together in loose assembly to surround the plate and to interlock with each other. In order to insure that the surfaces of the paste retainer conform in shape to the surface irregularities of the active paste on the grid, the loose assembly may then be inserted within a vacuum bag which is clamped shut. The air is then exhausted from the bag and heat is applied. The differential in pressure between the exterior and interior of the bag presses the bag tightly against the loose assembly. The heat and the pressure of the vacuum bag against the retainer material, such as perforate hard rubber, cause the material to conform with the surface irregularities or configurations of the pasted plate while at the same time the adhesive sticks the sections together. The bag may then be cooled and the final plate covered with the envelope withdrawn.

The accompanying drawing illustrates two present preferred embodiments of the invention in which:

Fig. 1 is a perspective view of a finished battery plate covered with paste retainer material;

Fig. 2 is an exploded view showing the parts of the retainer immediately prior to assembly onto the battery plate;

Fig. 3 is a cross-section taken on the lines 3—3 of Fig. 1;

Fig. 4 is an exploded view similar to Fig. 2 of an alternative paste retainer prior to assembly; and Fig. 5 is a cross-sectional view of the covered battery plate shown in Fig. 4 after assembly.

Referring to Figs. 1, 2 and 3, a battery unit embodying this invention comprises a metallic grid 1 which is divided by longitudinal openings 2 into a plurality of columns 3, 4, 5 and 6, each having an open grid 7. Conducting end pieces 8 and 10 connect these columns and a terminal 11 extends from the end piece 10 beyond column 6.

The grids 7 in the columns 3, 4, 5 and 6 are packed and covered with electrochemically active paste material 12 which forms their exterior surfaces. Each column is covered by upper and lower telescoping flanged strips 13 and 14, respectively, of perforate sheet paste retaining material, so that the flanges of each strip 14 fit over the edges of the columns and are overlapped by the flanges of each corresponding strip 13 to enclose the several columns as illustrates in Fig. 3. Flanged end strips 15 and 16 of retainer material overlap ends of the strips 13 and 14 completing the assembly, the strip 15 having a slot for the accommodation of the terminal 11. Adhesive 17, between the exterior faces of the flanges of strip 14 and the interior faces of the flanges on the strips 13, holds the assembly in permanent relation relative to the plate 1.

The plate 1 is the usual lead grid filled with active paste material 12, for example, lead oxide composition. The adhesive 17 may be of desired composition which is unaffected by the acid in the battery, and is preferably soft, pliable or moldable at temperatures which are not injurious to the lead or the paste material or the sheet retainer material.

The paste retainer of which the flanged strips are formed is a perforate sheet which may be formed of any suitable material that is susceptible of being molded into conformity with the irregularities of the pasted grid, and that will remain stiff and retain its molded shape after the molding process. Various materials are suitable, but I prefer to use a heat-hardenable plastic, a microporous structure of hard rubber, or sheet material as disclosed in United States Patent No. 2,121,872 or 2,079,584. This latter sheet may, for example, have a thickness of the order of .012 inch and elongated perforations 19 arranged preferably in diagonal rows with respect to the angle which forms the flanges on the strips. Such elongated perforations may, for example, represent void spaces equal to 38% of the total area, thus insuring adequate flow of the battery acid therethrough. Perforations are indicated by the dash lines in Figs. 1, 2 and 4 but have been omitted from the cross section of the retainer material in Figs. 3 and 5 for the sake of clarity due to their preferably extremely minute dimensions. The hard rubber paste retainer maintains its shape and stiffness throughout normal operating conditions.

Figs. 4 and 5 illustrate an alternative embodiment of the invention in which a battery plate is covered with two interlocking half envelopes secured by anchoring strips inserted into slots in the plate. A battery plate 20 is divided by longitudinal slots 21 into columns 22, 23, 24 and 25, each column having a grid section 26 which is packed with active paste material 27. The columns, as in the plate previously described, are connected at each end by conductive end pieces 28 and 29, and the terminal 30 extends outwardly beyond the column 22. Upper and lower molded half envelopes of thermoplastic perforate sheet material 31 and 32, respectively, are fitted above and below the plate so that the edge portions of the lower half-envelope 32 overlap those of the upper half-envelope 31. Anchoring strips 33, preferably of vulcanized hard rubber fit into the slots 21 so that their exposed edges lie generally in the plane of the outer surface of the paste material 27. These outer edges of the anchoring strips and the outer faces of the edge portions of the upper half envelope 31 are provided with adhesive 34 which retains the assembly in permanent and practically unitary relationship. The broad surfaces of the half envelopes are caused, by the heating and pressure steps described in detail in my Patent No. 2,277,763, to conform in shape to the irregularities in the active paste material 27, which, as above described are the result of the processing steps in making up the battery plate before application of the paste retainer thereto.

If desired, the present battery paste retainer may be applied out of direct contact with the paste as for example around an intermediate cover of protective material such as glass wool. The pressure fit of the retainer holds the glass wool tightly against the paste throughout the contacting surface. By this invention, the battery paste, even though its outer surface has an irregular configuration, and even when subjected to excessive vibration, is permanently held in position by the paste retaining envelope which closely conforms to all of the irregularities in the surface of the grid.

While certain present preferred embodiments of the invention have been shown and described, it is to be understood that other embodiments may be practiced without departing from the spirit of the invention and the scope of the appended claims.

Having thus described my invention what I claim and desire to protect by Letters Patent is:

1. A shielded storage battery plate comprising a pasted grid having slots extending therethrough, rubber strips in said slots, perforated hard rubber sheet material having overlapping flanges surrounding said grid, adhesive securing the outer edges of said rubber strips to said sheet material and adhesive securing said overlapping flanges together.

2. A shielded storage battery plate comprising in combination a pasted grid having slots extending therethrough, perforated hard rubber sheet material surrounding said grid, and rubber strips in said slots extending from one face of said rubber sheet material to the opposite face of said rubber sheet material, the outer edges of said rubber strips being adhesively secured to said sheet material.

ALEXIS W. KEEN.

CERTIFICATE OF CORRECTION.

Patent No. 2,315,498. April 6, 1943.

LESLIE G. S. BROOKER, ET AL.

It is hereby certified that error appears in the printed specification of the above numbered patent requiring correction as follows: Page 4, second column, line 75, claim 17, for "phenylene" read --naphthylene--; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.